United States Patent Office 2,806,789
Patented Sept. 17, 1957

2,806,789
ENHANCEMENT OF THERAPEUTIC EFFICACY OF ANTIBIOTICS

Jackson Sebree Kiser, Orangeburg, N. Y., and John A. Roberts, Westwood, N. J., assignors to American Cyanamid Company, New York, N. Y., a corporation of Maine No Drawing. Application September 10, 1954,
Serial No. 455,354

6 Claims. (Cl. 99—2)

This invention relates to a method of increasing the therapeutic efficacy of a broad-spectrum antibiotic of the tetracycline group.

Broad-spectrum antibiotics such as those of the tetracycline group antibiotics including chlortetracycline, oxytetracycline, tetracycline and bromotetracycline have been fed to farm animals to induce an improvement in feed conversion and for various medicinal purposes, both prophylactic and therapeutic. Because of the comparatively high cost of these antibiotic materials it is highly desirable that a maximum response be obtained with the administration of a minimum of the antibiotic.

It now appears that various natural or added constituents of feedstuffs can in part bind these tetracycline group antibiotics or slow down their rate of absorption so that a larger dosage is required for therapeutic effectiveness. Usually the blood levels of the antibiotics are accepted as a full measure of the absorption and an indication of the therapeutic efficacy.

While the present invention is useful in the treatment of humans, the economical advantages are more important in the treatment of animals because the economy of treating animals and the cost of the therapeutic agents plays a more critical part in determining the therapeutic regimen.

Normally feedstuffs for animals such as poultry and swine contain a comparatively high quantity of calcium. Feedstuffs for poultry usually contain between 2 and 3% of calcium, calculated as calcium ion. Other metals including the heavy metals play a part in tieing up the tetracycline group antibiotics but the calcium is the principal offender because of the large quantity usually fed. Commercial feeds are usually blended with calcium carbonate. In poultry particularly a deficiency in calcium, phosphorus and vitamin D can induce rickets. An adequate supply of all three is included to avoid inducing rickets. It has been found that for a short period such as required for therapeutic purposes, a diet may be used which is low in calcium but which contains the normal amounts of vitamin D and the poultry show no ill effects from being deprived of calcium during the period of antibiotic treatment.

The normal constituents for animal feed including grain and protein supplements contain considerable calcium. For example, bone meal, meat scrap and constituents of marine origin usually have considerable calcium. However, by choosing components with a low calcium content an animal feed can be prepared at competitive prices which has less than 1% and preferably less than ½% of calcium. Such a feed when administered to animals such as chickens receiving tetracycline group antibiotics markedly augments the rate of absorption of these antibiotics by the animals. It is convenient to mix the antibiotic with the low calcium containing feed although the antibiotic may be separately administered, as for example, in the drinking water of the animal.

The rate of absorption can also be augmented by the addition of a calcium sequestering material such as ethylenediamine tetraacetic acid or its salts, other nontoxic alkylene polyamine polycarboxylic acids, and their salts, citric acid or its salts, ascorbic acid or its salts, polyphosphoric acid or its salts, or pyrophosphoric acid or its salts to the animal diet.

The tetracycline group antibiotic may be chlortetracycline, oxytetracycline, tetracycline or bromotetracycline or acid salts of these antibiotics such as the hydrochloride, hydrobromide, sulfate, nitrate, phosphate, acetate, ascorbate, citrate, or basic salts such as the sodium, potassium, calcium, quaternary ammonium, or ethylenediamine, or the aluminum gluconate complex, other organic acid complexes or other therapeutically effective salts or combination of salts of these antibiotics.

A feedstuff for poultry may be prepared, for example, by mixing:

|   | Lbs. |
|---|---|
| Ground yellow corn | 932.3 |
| Wheat middlings | 150 |
| Pulverized heavy oats | 100 |
| Soybean oil meal | 500 |
| Corn gluten meal | 100 |
| Distillers' solubles | 100 |
| Dehydrated alfalfa | 100 |
| Iodized salt | 10 |
| Manganese salt | 0.5 |
| D-activated animal sterol, 2000 units per gram | 2 |
| Vitamin A oil, 4000 units per gram | 2 | and additinoal vitamins including riboflavin, panothenic acid, niacin, choline and folic acid.

The above mixture is by way of illustration only. Many comparable feeds are easily blended. The formula of commercial feedstuffs usually vary from time to time, depending upon the relative price of materials at the time of formulation.

By way of illustration, certain examples of the results obtained by using a low calcium feed are shown:

EXAMPLE I

A group of Indian White Cross chickens, with an equal number of cockrels and pullets in each group, were fed an antibiotic-free feed for three days. Groups of ten were fed their normal diet containing 2.2% of calcium, or a low calcium diet containing 0.35% calcium. These feedstuffs were administered with levels of 200, 400 or 800 grams of antibiotic per ton of feed and blood levels determined at 24, 48 and 72 hours.

A comparative run was also made on low calcium feedstuffs containing 12 kilograms per ton of the sodium salt of ethylenediamine tetraacetic acid (abbreviated Na₄EDTA).

The following table shows the blood levels in micrograms per milliliter in samples of blood obtained from the birds:

at each period. Table 3 below shows the average blood plasma concentration of chlortetracycline in micrograms

*Table I*

| Antibiotic | Time of Sample, hours | Regular Feed, grams/ton Antibiotic | | | Low Ca Feed and Na₄EDTA, grams/ton Antibiotic | | | Low Ca Feed only, grams/ton Antibiotic | | |
|---|---|---|---|---|---|---|---|---|---|---|
| | | 200 | 400 | 800 | 200 | 400 | 800 | 200 | 400 | 800 |
| Chlortetracycline hydrochloride | 24 | .085 | .176 | .316 | .264 | .434 | .762 | .25 | .27 | .672 |
| Tetracycline hydrochloride | | <.1 | .053 | .118 | .216 | .242 | .37 | .093 | .152 | .252 |
| Oxytetracycline hydrochloride | | <.1 | .218 | .109 | .377 | .646 | 1.432 | .25 | .376 | .708 |
| Chlortetracycline hydrochloride | 48 | .099 | .198 | .376 | .356 | .440 | .874 | .182 | .478 | .572 |
| Tetracycline hydrochloride | | <.05 | .067 | .140 | .390 | .394 | .758 | .087 | .216 | .320 |
| Oxytetracycline hydrochloride | | .135 | .140 | .286 | .532 | .798 | 1.57 | .28 | .558 | .780 |
| Chlortetracycline hydrochloride | 72 | .103 | .286 | .348 | .278 | .348 | .580 | .216 | .304 | .664 |
| Tetracycline hydrochloride | | <.05 | .075 | .147 | .236 | .182 | .380 | .168 | .136 | .338 |
| Oxytetracycline hydrochloride | | .081 | .105 | .204 | .404 | .776 | 1.264 | .208 | .336 | .724 |

EXAMPLE II

The above feeds were administered to groups of chickens which had been injected intraperitoneally with *Salmonella gallinarum*. The mean survival time for these groups of chicks was as follows:

*Table II*

| Chlortetracycline HCl, grams per ton | Regular Feed, hours | Low Calcium Feed, hours |
|---|---|---|
| None | 108 | 104 |
| 400 | 97 | 152 |
| 800 | 134 | 175 |

This table shows that 800 grams of chlortetracycline hydrochloride per ton of regular feed failed to give significant protection whereas 400 grams of chlortetracycline hydrochloride per ton of low calcium feed did give significant protection.

EXAMPLE III

Groups of ten birds with 5 pullets and 5 cockrels in each group were fed a low calcium diet, approximately 0.35% calcium, for three days prior to and during treatment. The birds were treated with a solution formed by adding chlortetracycline hydrochloride, citric acid and sugar in the ratio of 1 : 2.8 : 13 to water in such quantity that based on a consumption of 200 milliliters of water per bird per day, the birds received the indicated dosage. The solutions were made daily. The birds were given medicated water for three days and blood levels determined by bleeding from the heart on half of the birds at each period. Table 3 below shows the average blood plasma concentration of chlortetracycline in micrograms per milliliter. Each value is the average of five samples.

*Table III*

| Group | Dosage, mg./bird Chlortetracycline HCl | Micrograms per Milliliter | | |
|---|---|---|---|---|
| | | 24 hours | 48 hours | 72 hours |
| 1 | 25 | 0.44 | 0.30 | 0.57 |
| 2 | 50 | 0.55 | 0.87 | 0.78 |
| 3 | 100 | 0.99 | 1.32 | 1.53 |
| 4 | 200 | 1.09 | 1.75 | 1.79 |
| 5 | 400 | 2.97 | 3.33 | 3.24 |

We claim:
1. A feedstuff for animals undergoing tetracycline group antibiotic treatment comprising less than 1% calcium and from 50 to 800 grams per ton of a tetracycline group antibiotic.
2. The feedstuff of claim 1 in which said antibiotic is tetracycline hydrochloride.
3. The feedstuff of claim 1 in which said antibiotic is chlortetracycline hydrochloride.
4. The feedstuff of claim 1 in which said antibiotic is oxytetracycline hydrochloride.
5. The feedstuff of claim 1 in which said antibiotic is a quaternary ammonium salt of oxytetracycline.
6. A feedstuff for animals comprising edible protein nutrient materials, a tetracycline group antibiotic selected from the group consisting of tetracycline, chlortetracycline, oxytetracycline and bromotetracycline, and their therapeutically effective salts, and less than 1% calcium.

References Cited in the file of this patent

Sizemore et al.: Poultry Science, vol. 32, No. 4, July 1953, pages 618–624 (pages 618–619 relied upon).

Eisner et al.: Jr. Pharm. and Exp. Therap., August 1953, pages 442–449 (pages 447–448 relied upon).